US012322531B2

(12) United States Patent
Hayakawa et al.

(10) Patent No.: US 12,322,531 B2
(45) **Date of Patent: *Jun. 3, 2025**

(54) COMPOSITE CABLE AND COMPOSITE HARNESS

(71) Applicant: Hitachi Metals, Ltd., Tokyo (JP)

(72) Inventors: Yoshikazu Hayakawa, Tokyo (JP); Tomoyuki Murayama, Tokyo (JP); Hirotaka Eshima, Tokyo (JP); Takahiro Futatsumori, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/481,476

(22) Filed: Sep. 22, 2021

(65) Prior Publication Data

US 2022/0102027 A1 Mar. 31, 2022

(30) Foreign Application Priority Data

Sep. 25, 2020 (JP) ................................ 2020-160461

(51) Int. Cl.

*H01B 11/04* (2006.01)
*H01B 7/00* (2006.01)
*H01B 9/00* (2006.01)
*H01B 11/00* (2006.01)

(52) U.S. Cl.

CPC ........... *H01B 9/003* (2013.01); *H01B 7/0045* (2013.01); *H01B 11/002* (2013.01); *H01B 11/04* (2013.01)

(58) Field of Classification Search

CPC .............................. H01B 7/0045; H01B 11/04
See application file for complete search history.

(56) References Cited

U.S. PATENT DOCUMENTS 6,563,052 B2 * 5/2003 Groegl ............... H01B 11/1016 174/106 R
9,000,301 B2 4/2015 Hayakawa et al.
9,257,215 B2 * 2/2016 Wollitzer ............... H01B 11/04
10,002,689 B2 * 6/2018 Straniero ............... H01B 9/028
10,361,015 B1 * 7/2019 Skidmore ............. H01B 9/028
11,664,136 B2 * 5/2023 Hayakawa ............. H01B 11/02 174/72 A (Continued)

FOREIGN PATENT DOCUMENTS

JP 2014-515162 A 6/2014
JP 5541331 B2 7/2014

(Continued)

OTHER PUBLICATIONS

Japanese Office Action issued in Japanese Application No. 2020-160461 on Jan. 23, 2024 and English Translation thereof.

*Primary Examiner* — Chau N Nguyen
(74) *Attorney, Agent, or Firm* — MCGINN I.P. LAW GROUP, PLLC

(57) ABSTRACT

A composite cable includes a plurality of power lines, one signal line unit, and a sheath collectively covering the plurality of power lines and the one signal line unit. The signal line unit includes a plurality of pairs of signal lines, and an inner sheath covering a first assembled article. The first assembled article is formed by arranging the signal lines to be paired at each pair of opposing vertices of a polygon with an even number of vertices in a cross-section perpendicular to a longitudinal direction of the signal line unit and twisting all the signal lines together.

20 Claims, 8 Drawing Sheets

(56) References Cited

U.S. PATENT DOCUMENTS

| | | | | |
|---|---|---|---|---|
| 2011/0088926 | A1* | 4/2011 | Grogl | H01B 11/1091 174/107 |
| 2013/0277087 | A1* | 10/2013 | Hayakawa | B60R 16/0215 174/107 |
| 2014/0190741 | A1* | 7/2014 | Hayakawa | B60R 16/0215 174/72 A |
| 2017/0263353 | A1* | 9/2017 | Hayakawa | H01B 3/002 |
| 2017/0264063 | A1* | 9/2017 | Hayakawa | B60R 16/0215 |
| 2019/0248308 | A1* | 8/2019 | Hayakawa | H01B 7/041 |
| 2020/0013524 | A1 | 1/2020 | Eshima et al. | |
| 2020/0168359 | A1* | 5/2020 | Kohori | H01B 7/0869 |
| 2022/0028579 | A1* | 1/2022 | Kobayashi | H01B 7/0045 |
| 2022/0215985 | A1* | 7/2022 | Koeppendoerfer | H01B 9/003 |
| 2022/0415539 | A1* | 12/2022 | Ooshima | H01B 11/02 |
| 2023/0109517 | A1* | 4/2023 | Liu | G06V 10/147 701/23 |

FOREIGN PATENT DOCUMENTS

| | | | |
|---|---|---|---|
| JP | 2020-009610 | A | 1/2020 |
| JP | 2020-047450 | A | 3/2020 |

* cited by examiner

COMPOSITE CABLE AND COMPOSITE HARNESS

CROSS-REFERENCES TO RELATED APPLICATION

The present patent application claims the priority of Japanese patent application No. 2020-160461 filed on Sep. 25, 2020, and the entire contents thereof are hereby incorporated by reference.

BACKGROUND OF THE INVENTION

1. Field of the Invention

The present invention relates to a composite cable and a composite harness.

2. Description of the Related Art

Conventionally, a composite cable in which power lines and signal lines are collectively covered with a sheath is known. A cable known as such a composite cable includes signal lines to be connected to an ABS (Anti-lock Brake System) sensor for measuring the speed of a vehicle's wheel rotation and power lines to be connected to an electric parking brake device for preventing wheel rotation after the vehicle is stopped. (see, e.g., Japanese Patent No. 5541331).

The ABS sensor is attached to an end of an ABS sensor cable. This ABS sensor constitutes a part of an ABS device mounted on the vehicle and is a sensor that measures the speed of the vehicle's wheel rotation. When, e.g., a braking system is activated, the ABS device controls the braking system based on the measured rotation speed of wheels so that the wheels do not spin free.

CITATION LIST

Patent Literature

Patent Document 1: Japanese Patent No. 5541331

SUMMARY OF THE INVENTION

The outer diameter of the conventional composite cable becomes large when, e.g., two twisted pair wires and the power lines are twisted together and are covered with a sheath. The conventional composite cable has a problem that resistance to external noise decreases when the twist of the twisted pair wires collapses due to reducing the diameter.

Therefore, it is an object of the invention to provide a composite cable and a composite harness that can be reduced in diameter and can suppress a decrease in resistance to noise.

For solving the above problem, one aspect of the present invention provides a composite cable, comprising:

a plurality of power lines;

one signal line unit; and a sheath collectively covering the plurality of power lines and the one signal line unit, wherein the signal line unit comprises a plurality of pairs of signal lines, and an inner sheath covering a first assembled article including the signal lines to be paired being arranged at each pair of opposing vertices of a polygon with an even number of vertices in a cross-section perpendicular to a longitudinal direction of the signal line unit and being twisted all together.

Advantageous Effects of Invention

According to the present invention, it is possible to provide a composite cable and a composite harness that can be reduced in diameter and can suppress a decrease in resistance to noise.

BRIEF DESCRIPTION OF THE DRAWINGS

Next, a preferred embodiment according to the present invention will be described with reference to appended drawings, wherein.

DETAILED DESCRIPTION OF THE PREFERRED EMBODIMENT (Embodiment)

Figure 1:
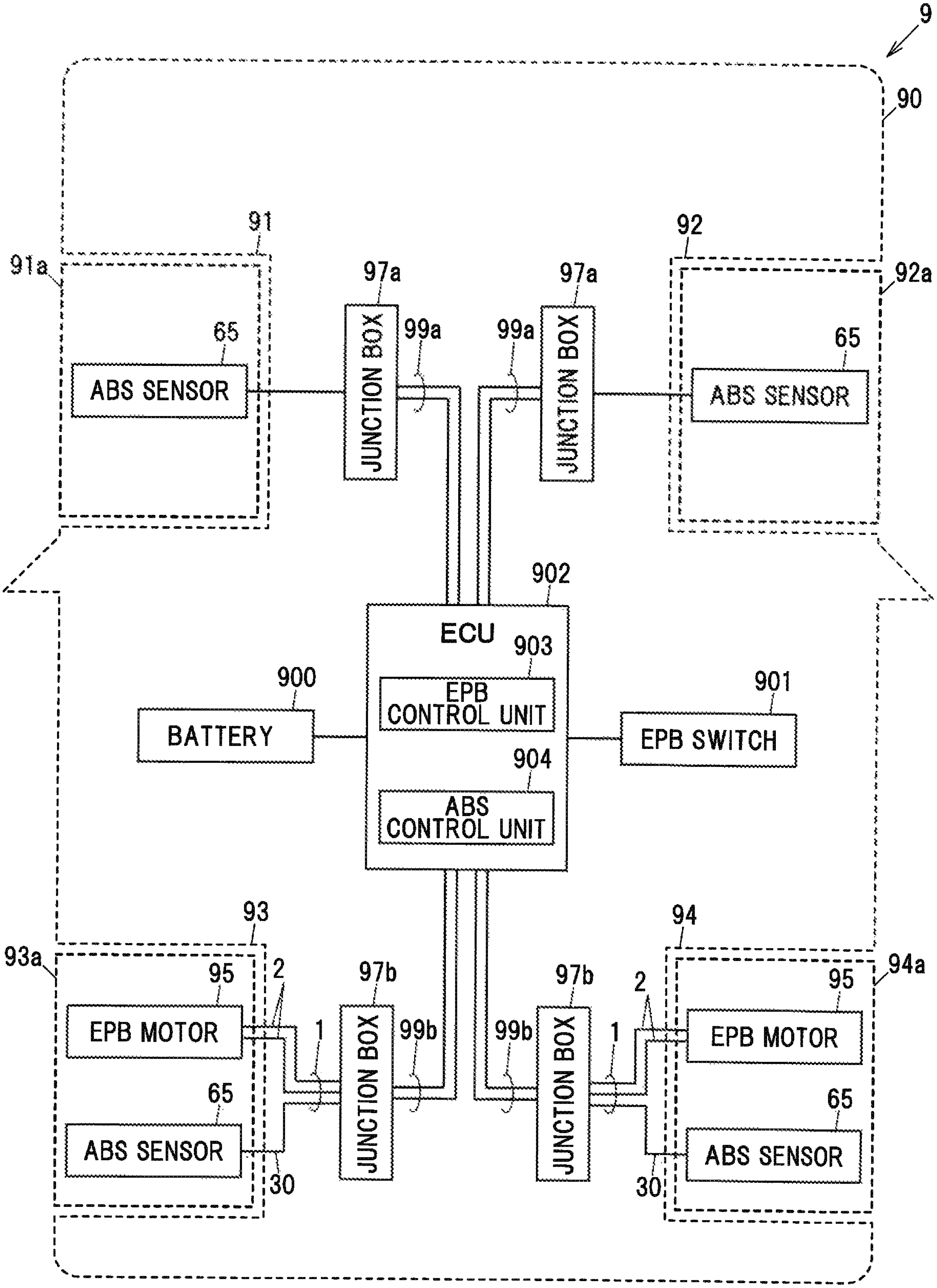
FIG. 1 is a diagram illustrating an example configuration of a vehicle in which composite harnesses in an embodiment are used.
Figure 2:
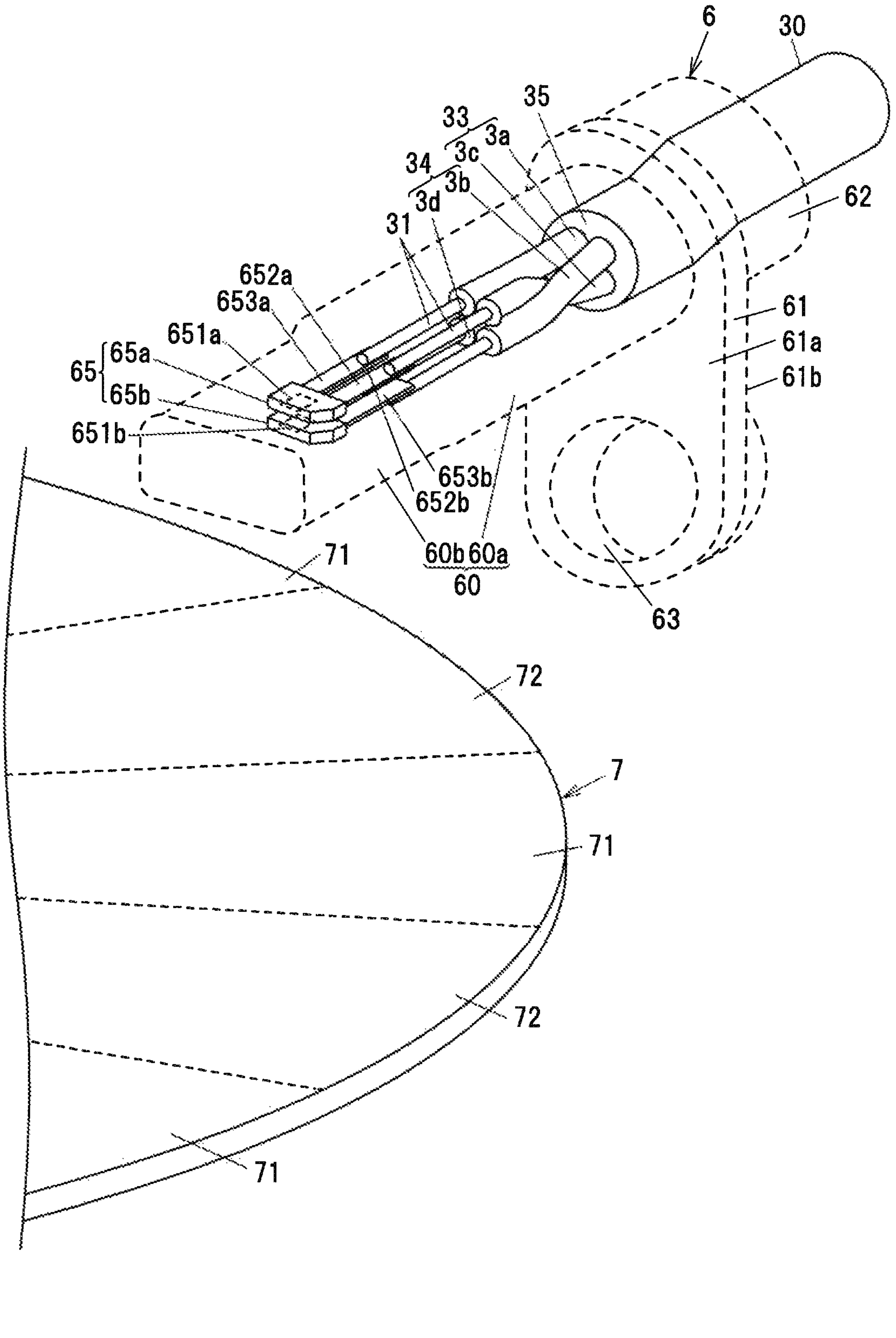
FIG. 2 is a perspective view showing an example of a sensor head and a rotor in the embodiment.

An embodiment of the invention will be described below in conjunction with the appended drawings. FIG. 1 is a diagram illustrating an example configuration of a vehicle in which composite harnesses in an embodiment are used. FIG. 2 is a perspective view showing an example of a sensor head and a rotor in the embodiment. In each drawing of the embodiment described below, a scale ratio and shape may be different from an actual ratio and shape.

As shown in FIG. 1, a vehicle 9 has wheel-wells 91 to 94 on a vehicle body 90. A front wheel 91*a* to a rear wheel 94*a* as wheels are arranged in the wheel-wells 91 to 94.

An electric parking brake (EPB) to prevent rotation of the rear wheel 93*a* and the rear wheel 94*a* after stopping the vehicle 9 is mounted on the vehicle 9. This electric parking brake includes EPB motors 95, an EPB switch 901 arranged in a vehicle interior, and an EPB control unit 903.

The EPB motors 95 are arranged on the rear wheel 93*a* and the rear wheel 94*a* of the vehicle 9. The EPB motors 95 generate a braking force by driving hydraulic braking devices arranged on the rear wheel 93*a* and the rear wheel 94*a*. Alternatively, the EPB motors 95 may be arranged on the front wheel 91*a* and the front wheel 92*a* or may be arranged on the front wheel 91*a* to the rear wheel 94*a*.

The EPB switch 901 is a lever switch and turns from the OFF state to the ON state when the lever is moved up. The EPB switch 901 is electrically connected to the EPB control unit 903.

The EPB control unit 903 is a microcomputer composed of a CPU (Central Processing Unit), a RAM (Random Access Memory) and a ROM (Read Only Memory), etc. The EPB control unit 903 is mounted on an ECU (Electronic Control Unit) 902. Alternatively, the EPB control unit 903 may be mounted on a control unit other than the ECU 902 or may be mounted on a dedicated hardware unit.

The EPB control unit 903 is configured to output a drive current to the EPB motors 95 for a predetermined period of time (e.g., for 1 second) when the EPB switch 901 is turned from the OFF state to the ON state during the stationary state of the vehicle 9 so that a braking force to be applied to the rear wheel 93*a* and the rear wheel 94*a* is generated.

The EPB control unit 903 is configured to output a drive current to the EPB motors 95 also when the EPB switch 901 is turned from the ON state to the OFF state or when an accelerator pedal is depressed, so that the braking force on the rear wheel 93*a* and the rear wheel 94*a* is released. The EPB switch 901 is not limited to the lever switch and may be a pedal switch.

An anti-lock braking system is also mounted on the vehicle 9. This anti-lock braking system includes ABS sensors 65 arranged for the front wheel 91*a* to the rear wheel 94*a*, and an ABS control unit 904.

The ABS sensors 65 are arranged for the front wheel 91*a* to the rear wheel 94*a* and detect the rotation speeds of the front wheel 91*a* to the rear wheel 94*a*. The ABS sensors 65 are electrically connected to the ABS control unit 904.

As shown in FIG. 2, the ABS sensors 65 are configured to detect changes in magnetic fields formed by first magnetized regions 71 and second magnetized regions 72 of disc-shaped rotors 7 arranged on hubs to which the front wheel 91*a* to the rear wheel 94*a* are attached. The first magnetized regions 71 and the second magnetized regions 72 are regions formed so that N-poles and S-poles are alternately arranged in a circumferential direction of the rotor 7.

As shown in FIG. 2, the ABS sensor 65 is housed in a sensor head 6. For the purpose of redundancy, the ABS sensor 65 has plural sensors which have the same configuration, i.e., which respond to a change in the magnetic field due to rotation of the rotor 7 in the same way.

As described later, the ABS control unit 904 calculates the rotation speed based on signals output from the plural sensors and also detects failure of the ABS sensors 65.

The ABS control unit 904 is a microcomputer composed of a CPU, a RAM and a ROM, etc. The ABS control unit 904 is mounted on the ECU 902. The ABS control unit 904 controls the braking force to the front wheel 91*a* to the rear wheel 94*a* based on outputs from the ABS sensors 65 so that the front wheel 91*a* to the rear wheel 94*a* do not lock at the time of emergency stop. Alternatively, the ABS control unit 904 may be mounted on a control unit other than the ECU 902 or may be mounted on a dedicated hardware unit.

One end of a composite harness 1 in the present embodiment is electrically connected to the EPB motor 95 located outside the vehicle body 90 and is also electrically connected to the sensor head 6 that houses the ABS sensor 65. Meanwhile, the other end of the composite harness 1 is electrically connected to a wire group 99*b* in a rear wheel-side junction box (relay box) 97*b* inside the vehicle body 90 and is electrically connected to the ECU 902.

The ABS sensors 65 arranged for the front wheel 91*a* and the front wheel 92*a* are electrically connected to the ECU 902 via front wheel-side junction boxes 97*a* and wire groups 99*a*.

The ECU 902 is electrically connected to a battery 900. The EPB control unit 903 of the ECU 902, when activating the electric parking brake, generates a drive current from the battery 900 and supplies it to the EPB motors 95 via the wire groups 99*b*, the junction boxes 97*b* and the composite harnesses 1. Meanwhile, the ABS control unit 904 generates power-supply voltage Vcc from the battery 900 and supplies it to the sensor heads 6 via the wire groups 99*b*, the junction boxes 97*b* and the composite harnesses 1.

(Configuration of the Composite Harness 1)

Figure 3:
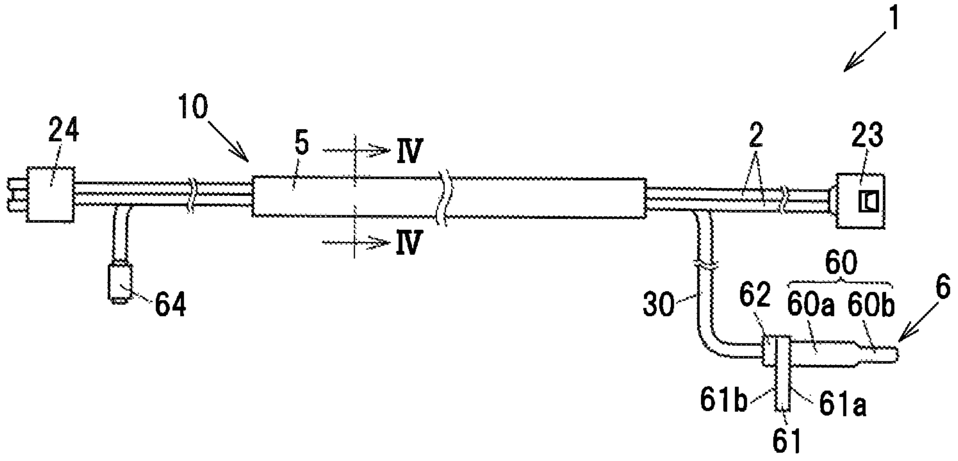
FIG. 3 is a diagram illustrating an example of the composite harness in the embodiment.
Figure 4:
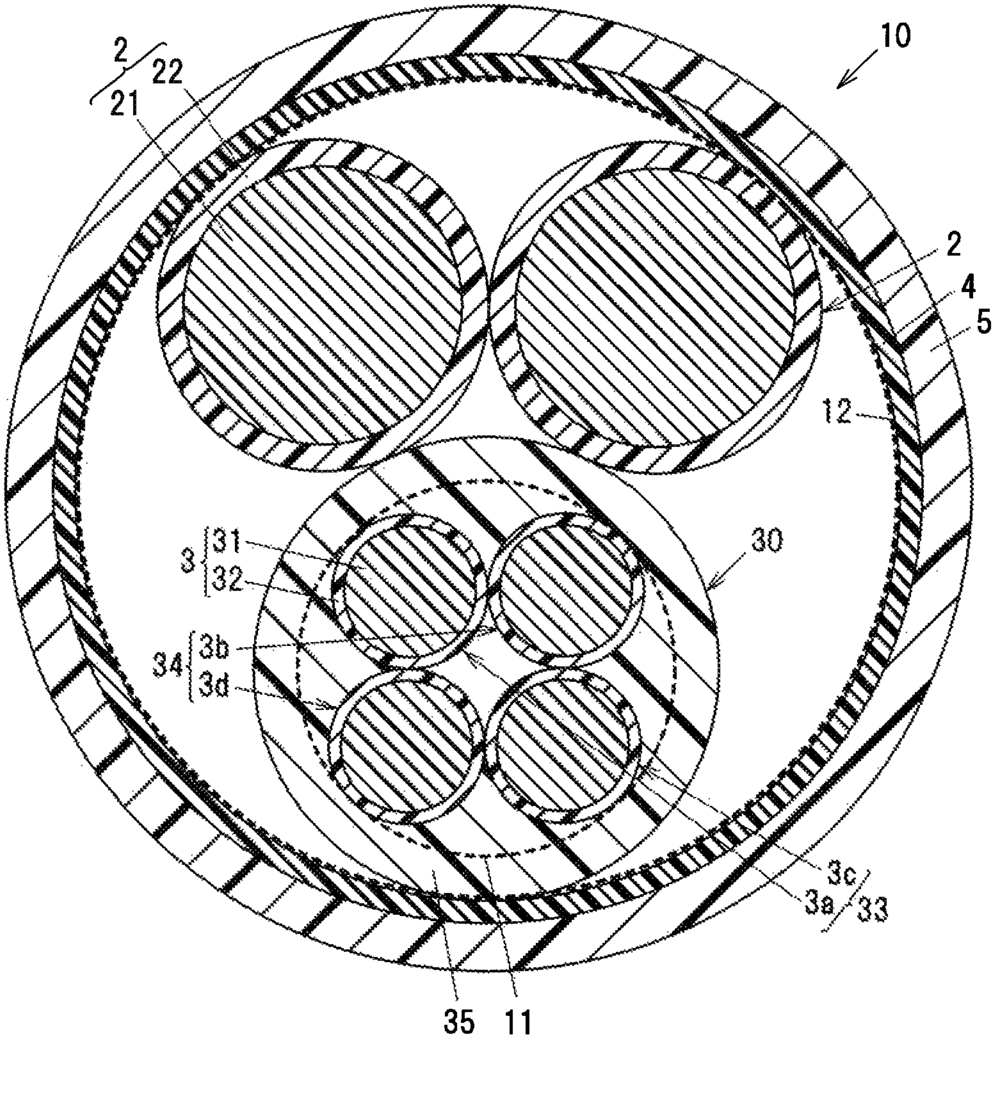
FIG. 4 is an example cross-sectional view when a cross-section of the composite harness in the embodiment taken along line IV-IV in FIG. 3 is viewed from a direction of arrows.

FIG. 3 is a diagram illustrating an example of the composite harness in the embodiment. FIG. 4 is an example cross-sectional view when a cross-section of the composite harness in the embodiment taken along line IV-IV in FIG. 3 is viewed from a direction of arrows.

As shown in FIG. 3, the composite harness 1 is generally composed of a composite cable 10, a vehicle external-side EPB connector 23, a vehicle internal-side EPB connector 24, the sensor head 6, and a vehicle internal-side ABS connector 64.

As shown in FIG. 4, the composite cable 10 is generally composed of two power lines 2, one signal line unit 30, and an outer sheath 5 collectively covering the two power lines 2 and the one signal line unit 30. The outer sheath 5 is provided on the composite cable 10 so as to collectively cover a second assembled article 12 formed by twisting the two power lines 2 and the one signal line unit 30.

The signal line unit 30 includes plural pairs of signal line 3 and an inner sheath 35 covering a first assembled article 11 that is formed by arranging the signal lines 3 to be paired at each pair of opposing vertices of a polygon with an even number of vertices in a cross-section perpendicular to a longitudinal direction of the signal line unit 30 and twisting all signal lines 3 together. In the composite cable 10, a binding tape 4 is provided between the second assembled article 12 and the outer sheath 5.

The two power lines 2 are used as a pair and thus will be referred to as a pair of power lines 2. However, the number of the power lines 2 is not limited thereto and may be more than two.

The four signal lines 3 will be referred to as a signal line 3*a*, a signal line 3*b*, a signal line 3*c* and a signal line 3*d* from the top left in the clockwise direction on the paper surface of FIG. 4. In the present embodiment, the opposing signal lines 3*a* and 3*c* and the opposing signal lines 3*b* and 3*d* are used in pairs. Thus, in the following description, the signal line 3*a* and the signal line 3*c* as a pair of signal lines will be referred to as a first signal line pair 33, and the signal line 3*b* and the signal line 3*d* as a pair of signal lines will be referred to as a second signal line pair 34. In this regard, the number of pairs of signal lines is not limited thereto and may be increased according to the number of sensors (to be described later).

(Configuration of the Power Line 2)

The pair of power lines 2 are used to supply a drive current to the EPB motor 95. The vehicle external-side EPB connector 23 to be connected to the EPB motor 95 is attached to one end of the pair of power lines 2, and the vehicle internal-side EPB connector 24 to be connected to the junction box 97*b* in the vehicle is attached to the other end of the pair of power lines 2.

As shown in FIG. 4, the power line 2 is composed of a first conductor wire 21 and a first insulation 22 covering the first conductor wire 21. The first conductor wire 21 is formed by, e.g., twisting plural strands (elementary wires) composed of copper or a coper alloy. The direction of this twist will be described later. The first insulation 22 is formed using, e.g., cross-linked polyethylene.

Strands having a diameter of 0.05 mm or more and 0.30 mm or less can be used to form the first conductor wire 21, as an example. When using strands having a diameter of less than 0.05 mm, sufficient mechanical strength may not be obtained, causing a decrease in flex resistance. On the other hand, when using strands having a diameter of more than 0.30 mm, flexibility of the composite harness 1 may decrease. An outer diameter of the power line 2 is 3.0 mm, as an example.

(Configuration of the Signal Line 3)

The four signal lines 3 are covered with the inner sheath 35 in a state where adjacent ones of the signal lines 3 are in contact with each other. The four signal lines 3 in contact with each other are twisted together and a hollow is formed at the center, as shown in FIG. 4.

The sensor head 6 housing the ABS sensor 65 is attached to one end of the signal line unit 30 and the vehicle internal-side ABS connector 64 to be connected to the junction box 97*b* in the vehicle is attached to the other end of the signal line unit 30.

The signal line 3 is composed of a second conductor wire 31 and a second insulation 32 covering the second conductor wire 31. The second conductor wire 31 is formed by, e.g., twisting plural strands composed of copper or a coper alloy. The second insulation 32 is formed using, e.g., cross-linked polyethylene.

Strands having a diameter of 0.05 mm or more and 0.30 mm or less can be used to form the second conductor wire 31, in the same manner as the first conductor wire 21. An outer diameter of the signal line 3 is 1.35 mm, as an example. An outer diameter of the inner sheath 35 in a state of covering the four signal lines 3 is 4.5 mm, as an example. A twisting direction of the second conductor wire 31 may be either clockwise or counterclockwise on the paper surface of FIG. 4.

The inner sheath 35 is provided to protect the four signal lines 3 and also to allow the shape to be easily adjusted when twisted with the pair of power lines 2. The inner sheath 35 is formed by, e.g., extruding a resin such as polyurethane.

The four signal lines 3 as the first assembled article 11 are all twisted together. A twist pitch of the first assembled article 11 is about 40 mm, as an example. A twisting direction of the first assembled article 11 will be described later. Meanwhile, the pair of power lines 2 and the signal line unit 30 are all twisted together and form the assembled article 12. A twist pitch of the second assembled article 12 is about 60 mm, as an example. A twisting direction of the second assembled article 12 will be described later.

A cross-sectional area (a conductor cross-sectional area) of the first conductor wire 21 and a thickness of the first insulation 22 in the power line 2 are appropriately adjusted according to magnitude of required drive current. In the present embodiment, the cross-sectional area (the conductor cross-sectional area) of the first conductor wire 21 is set to be larger than that of the second conductor wire 31 of the signal line 3, as described above. In other words, the first conductor wire 21 is formed thicker than the second conductor wire 31.

(Arrangement of the Signal Lines 3)

Figure 5A:
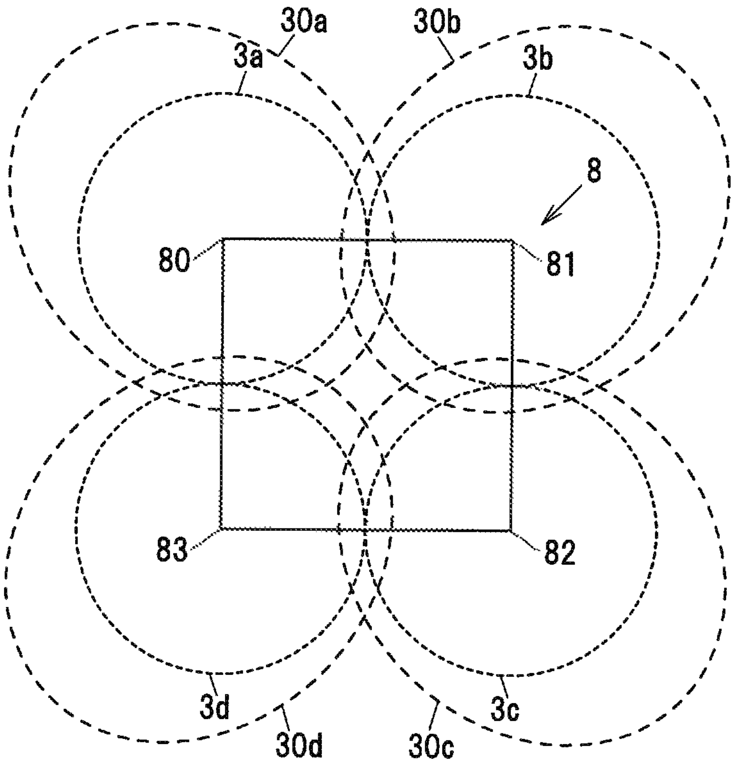
FIG. 5A is an explanatory diagram illustrating an example arrangement of signal lines in the embodiment.
Figure 5B:
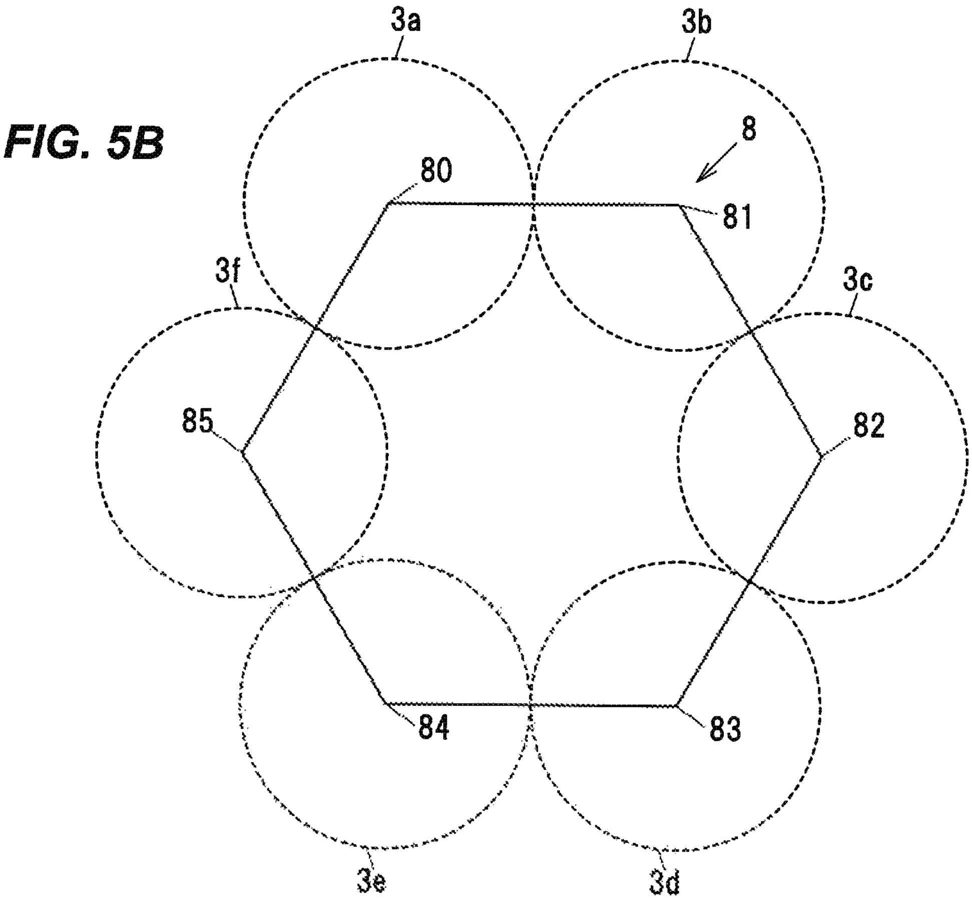
FIG. 5B is an explanatory diagram illustrating an example arrangement of the signal lines in a modification.

FIG. 5A is an explanatory diagram illustrating an example arrangement of the signal lines in the embodiment, and FIG. 5B is an explanatory diagram illustrating an example arrangement of the signal lines in a modification.

As shown in FIGS. 4 and 5A, the signal lines 3 are arranged in such a manner that each pair is arranged at a pair of opposing vertices of a polygon 8 with an even number of vertices. The polygon 8 shown in FIG. 5A is a square that has vertices 80 to 83 from the top left in the clockwise direction on the paper surface, as an example. The polygon 8 is desirably a regular polygon, but it is not limited thereto. The regular polygon here includes the deviation within the range of tolerance in manufacturing. In addition, "arranged at a vertex" means that the signal line 3 is arranged so that the center thereof in a lateral cross-section coincides with the vertex.

The vertex 80 and the vertex 82 are located opposite to each other. Thus, the signal line 3*a* is arranged so as to correspond to the vertex 80 and the signal line 3*c* paired with the signal line 3*a* is arranged so as to correspond to the vertex 82, as shown in FIG. 5A.

The vertex 81 and the vertex 83 are located opposite to each other. Thus, the signal line 3*b* is arranged so as to correspond to the vertex 81 and the signal line 3*d* paired with the signal line 3*b* is arranged so as to correspond to the vertex 83, as shown in FIG. 5A. In this regard, since the signal lines 3*a* to 3*d* are twisted together, the positions of the signal lines 3*a* to 3*d* are rotated from the positions as shown in FIG. 5A depending on where the cross-section is taken. That is, the oppositely located relationship between the signal line 3*a* and the signal line 3*c* and between the signal line 3*b* and the signal line 3*d* is maintained.

Here, a magnetic field 30*a* and a magnetic field 30*c* formed by the paired signal lines 3*a* and 3*c* repel each other at the center between the signal line 3*a* and the signal line 3*c* and have a shape drawn outward as shown in FIG. 5A, hence, an effect on the signal line 3*b* and the signal line 3*d* which are adjacent thereto is suppressed.

Likewise, a magnetic field 30*b* and a magnetic field 30*d* formed by the paired signal lines 3*b* and 3*d* repel each other at the center between the signal line 3*b* and the signal line 3*d* and have a shape drawn outward as shown in FIG. 5A, hence, an effect on the signal line 3*a* and the signal line 3*c* which are adjacent thereto is suppressed.

As such, by arranging the paired signal lines 3 so as to be located oppositely as shown in FIG. 5A, it is possible to suppress crosstalk between the signal lines 3*a* to 3*d*.

As a modification, the signal lines 3 may be arranged in such a manner that each pair is arranged at a pair of opposing vertices of the polygon 8 with six vertices, as shown in FIG. 5B. The polygon 8 shown in FIG. 5B is a regular hexagon that has vertices 80 to 85 from the top left in the clockwise direction on the paper surface, as an example. In this modification, signal lines 3*a* to 3*f* to be connected to three sensors are arranged at the vertices of the polygon 8.

In this modification, as an example, the signal line 3*a* arranged at the vertex 80 is paired with the signal line 3*d* arranged at the vertex 83, the signal line 3*b* arranged at the vertex 81 is paired with the signal line 3*e* arranged at the vertex 84, and the signal line 3*c* arranged at the vertex 82 is paired with the signal line 3*f* arranged at the vertex 85.

Alternatively, the signal lines 3 may be arranged in such a manner that each pair is arranged at a pair of opposing vertices of a polygon with a different even number of vertices.

(Twisting Directions)

Figure 6:
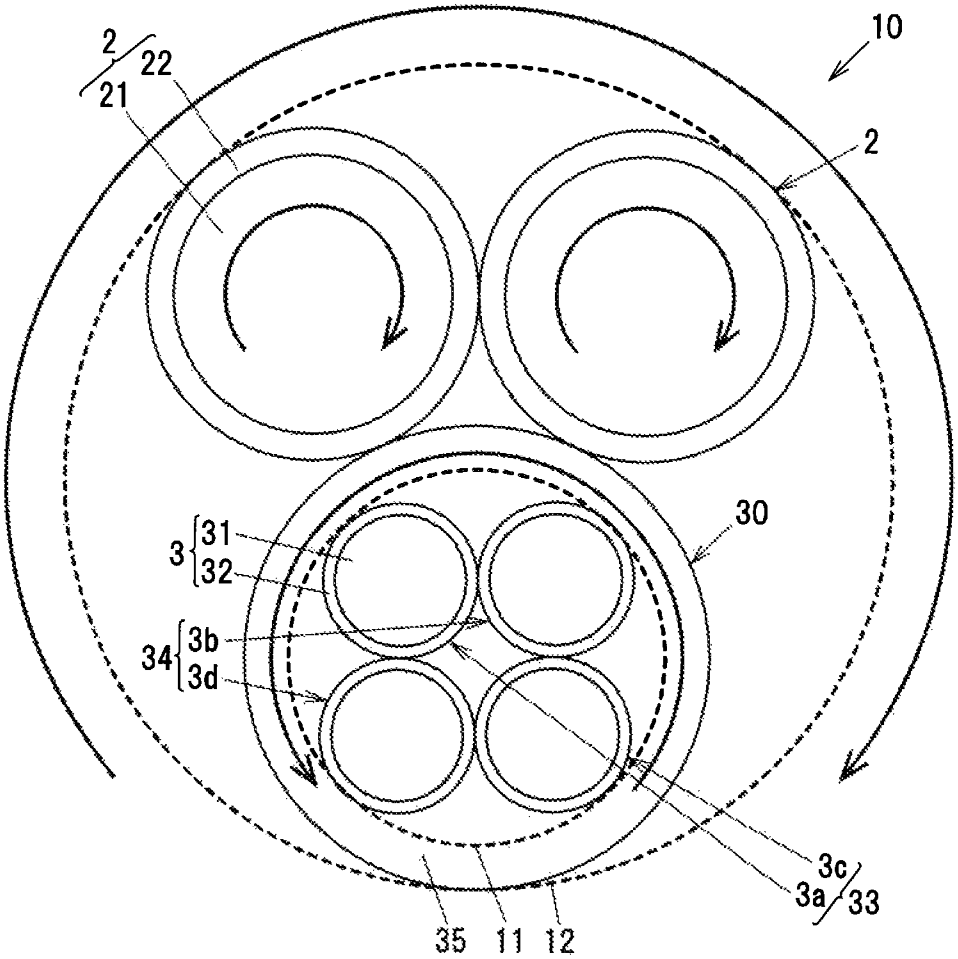
FIG. 6 is an explanatory diagram illustrating an example of twisting directions of a first assembled article, a second assembled article and a first conductor wire in the embodiment.

FIG. 6 is an explanatory diagram illustrating an example of twisting directions of the first assembled article, the second assembled article and the first conductor wire in the embodiment. In FIG. 6, the twisting directions are indicated by arrows.

The twisting direction of the first assembled article 11 is a direction that, when viewed from one end of the first assembled article 11, the signal lines 3 rotate from the other end to the one end. The twisting direction of the second assembled article 12 is a direction that, when viewed from one end of the second assembled article 12, the pair of power lines 2 and the signal line unit 30 rotate from the other end to the one end.

In particular, the composite cable 10 is configured such that when the twisting direction of the first assembled article 11 is counterclockwise (rotating left) on the paper surface of FIG. 6, the twisting direction of the second assembled article 12 is opposite, i.e., clockwise (rotating right).

The composite cable 10 is also configured such that the twisting direction of the first conductor wire 21 of the power line 2 is opposite to the twisting direction of the first assembled article 11 and is the same as the twisting direction of the second assembled article 12.

The twisting direction of the first assembled article 11 and the twisting direction of the second assembled article 12 are opposite to each other on the following grounds:

Kink of the first assembled article 11 and kink of the second assembled article 12, which are caused by twisting, are in the opposite directions and thus cancel out each other, and it is thereby possible to easily realize a straight composite cable 10 with suppressed kink.

In the composite cable 10, when, e.g., the twisting direction of the first assembled article 11 and the twisting direction of the second assembled article 12 are the same, the signal line unit 30 may be twisted in a direction of tightening the twist at the time of twisting the second assembled article 12, causing a change in the twist pitch of the first assembled article 11. By differing the twist directions of the two assembled articles, it is possible to maintain the twist pitch of the first assembled article 11 and thereby possible to suppress an effect of external noise due to unstable twist.

In addition, in the composite cable 10, it is also possible to suppress looseness of the twist of the first assembled article 11 by differing the twist directions of the two assembled articles Meanwhile, the reason why the twisting direction of the second assembled article 12 and the twisting direction of the first conductor wire 21 are the same is to suppress looseness of the twist of the first conductor wire 21.

(Configuration of the Binding Tape 4)

The binding tape 4 is spirally wound around the second assembled article 12. The binding tape 4 is interposed between the second assembled article 12 and the outer sheath 5 and is used to reduce friction between the second assembled article 12 and the outer sheath 5 when being bent, to improve handling properties of the composite cable 10 and to make the cross-sectional shape close to a circle.

The composite cable 10 may additionally have interpositions between the binding tape 4 and the power lines 2/the signal line unit 30. The interposition is a filler placed to fill between the binding tape 4 and the power lines 2/the signal line unit 30 and is formed in a string shape using an insulating material. The interposition is, e.g., cotton yarn composed of cotton, paper string, or string of synthetic fibers such as polypropylene.

The binding tape 4 is spirally wound around the second assembled article 12 in a state where a tensile force is applied. Thus, it is necessary to use the binding tape 4 which is not broken by a tensile force applied during winding. Meanwhile, the binding tape 4 is removed together with the outer sheath 5 when the cable is terminated. Therefore, it is desirable to use the binding tape 4 which can be easily removed at the time of cable termination.

Therefore, it is possible to use the binding tape 4 which is composed of, e.g., non-woven fabric, paper such as Japanese paper, or resin (resin film, etc.).

(Configuration of the Outer Sheath 5)

The outer sheath 5 covers and protects the pair of power lines 2 and the signal line unit 30 around which the binding tape 4 is wound. The outer sheath 5 is formed by, e.g., extruding a resin such as polyurethane around the binding tape 4.

(Configuration of the Sensor Head 6)

The sensor head 6 is formed by, e.g., injection molding using a thermosetting resin such as PC (Polycarbonate) or ABS (Acrylonitrile Butadiene Styrene).

As shown in FIG. 2, the sensor head 6 is generally composed of a sensor holder 60, a flange 61 and a cable holder 62.

The sensor holder 60 has an elongated quadrangular prism shape and has a base portion **60*a* and a tip portion 60*b*. The base portion 60*a* protrudes from a front surface 61*a* of the flange 61. The tip portion 60*b* is a tip portion of the base portion 60*a*, has a more elongated shape than the base portion 60*a*, and houses the ABS sensor 65**.

The flange 61 has a plate shape. The sensor holder 60 is provided on the front surface **61*a* of the flange 61 and the cable holder 62 is provided on a back surface 61*b* of the flange 61. The flange 61 also has a through-hole 63 through which a bolt is inserted when attaching to the vehicle 9. Alternatively, a metal reinforcing member may be inserted through the through-hole 63**.

The cable holder 62 holds the signal line unit 30. The signal line unit 30 and the ABS sensor 65 are integrated with the sensor head 6 by injection molding.

(Configuration of the ABS Sensor 65)

Figure 7A:
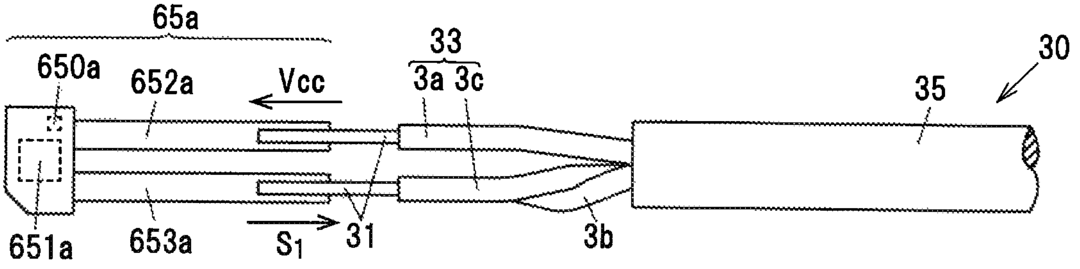
FIG. 7A is an explanatory diagram illustrating an example of connection between a first sensor IC and a signal line unit in the embodiment.
Figure 7B:
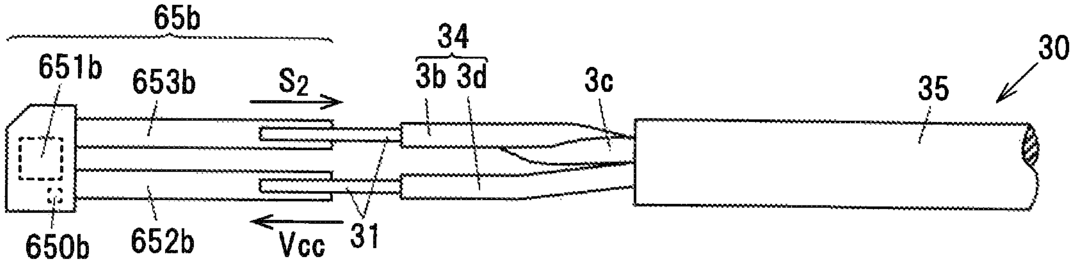
FIG. 7B is an explanatory diagram illustrating an example of connection between a second sensor IC and the signal line unit.

FIG. 7A is an explanatory diagram illustrating an example of connection between a first sensor IC (Integrated Circuit) and the signal line unit in the embodiment, and FIG. 7B is an explanatory diagram illustrating an example of connection between a second sensor IC and the signal line unit. FIG. 7A is a diagram when a first sensor IC **65*a* is viewed from above in FIG. 2. FIG. 7B is a diagram when a second sensor IC 65*b* is viewed from below in FIG. 2**.

The ABS sensor 65 has the first sensor IC **65*a* and the second sensor IC 65*b* for the purpose of redundancy. Each of the first sensor IC 65*a* and the second sensor IC 65*b* is configured to, e.g., detect a change in magnetic fields formed by the first magnetized regions 71 and the second magnetized regions 72 due to rotation of the rotor 7**, output a detection signal indicating "Hi" when the change is detected, and output a detection signal indicating "Lo" when the change is not detected.

The first sensor IC **65*a* has a control unit 650*a*, a magnetic sensor 651*a*, an input terminal 652*a* and an output terminal 653*a*. The control unit 650*a*, the magnetic sensor 651*a* and end portions of the input terminal 652*a* and the output terminal 653*a*** are sealed with a sealing resin.

As an example, the control unit 650*a* has a predetermined threshold and outputs a detection signal Si indicating "Hi" when an output of the magnetic sensor 651*a* is not less than the threshold. This detection signal $S_1$ is a square wave consisting of "Hi" and "Lo".

The magnetic sensor 651*a* has four magnetoresistive elements that form a bridge circuit. These four magnetoresistive elements are arranged with angles differed by 90° in a plane indicated by a dotted line in FIG. 2. The sensor head 6 is attached to the vehicle 9 so that the plane in which the four magnetoresistive elements are arranged is parallel to a surface 70 of the rotor 7 as shown in FIG. 2.

The magnetic sensor 651*a* and the magnetic sensor 651*b* (to be described later) here are not limited to the magnetoresistive elements and may be configured using magnetic sensor elements that detect a change in magnetic field, such as GMR (Giant MagnetoResistive effect) elements or Hall elements. Meanwhile, the first sensor IC 65*a* and the second sensor IC 65*b* may be configured to include bias magnets that cause a bias magnetic field to act on the magnetic sensor 651*a* and the magnetic sensor 651*b*. In this case, the rotor 7 does not need to be magnetized, is formed of a magnetic material and has plural gear teeth formed at equal intervals in a circumferential direction. The sensor head 6 is arranged so as to face the gear teeth, and the magnetic sensor 651*a* and the magnetic sensor 651*b* detect a change in the bias magnetic field caused by approach of the gear teeth.

The input terminal 652*a* and the output terminal 653*a* are composed of, e.g., an alloy of copper or aluminum, etc., and are formed in an elongated plate shape. The input terminal 652*a* and the output terminal 653*a* are electrically connected to the control unit 650*a*. The input terminal 652*a* and the output terminal 653*a* may be configured as part of a lead frame on which electronic components such as the control unit 650*a* are arranged.

The first signal line pair 33, which is a pair of signal lines 3, is connected to the input terminal 652*a* and the output terminal 653*a*. In particular, as shown in FIG. 7A, the second conductor wire 31 of the signal line 3*a* is connected to the input terminal 652*a* by solder or welding, etc. The second conductor wire 31 of the signal line 3*c* is connected to the output terminal 653*a* by solder or welding, etc.

The power-supply voltage Vcc to drive the first sensor IC 65*a* is supplied to the input terminal 652*a* from the ABS control unit 904. The output terminal 653*a* is connected to a ground circuit (GND) and the detection signal $S_1$ is output to the ABS control unit 904 through the output terminal 653*a*.

The second sensor IC 65*b* has a control unit 650*b*, the magnetic sensor 651*b*, an input terminal 652*b* and an output terminal 653*b*. The control unit 650*b*, the magnetic sensor 651*b* and end portions of the input terminal 652*b* and the output terminal 653*b* are sealed with a sealing resin.

The control unit 650*b* has a predetermined threshold and outputs a detection signal $S_2$ indicating "Hi" when an output of the magnetic sensor 651*b* is not less than the threshold. This detection signal $S_2$ is a square wave consisting of "Hi" and "Lo".

The magnetic sensor 651*b* has four magnetoresistive elements that form a bridge circuit, in the same manner as the magnetic sensor 651*a*. Since the magnetic sensor 651*b* and the magnetic sensor 651*a* are arranged in parallel, the magnetic sensor 651*b* is parallel to the surface 70 of the rotor 7.

The input terminal 652*b* and the output terminal 653*b* are composed of, e.g., an alloy of copper or aluminum, etc., and are formed in an elongated plate shape. The input terminal 652*b* and the output terminal 653*b* are electrically connected to the control unit 650*b*. The input terminal 652*b* and the output terminal 653*b* may be configured as part of a lead frame on which electronic components such as the control unit 650*b* are arranged.

The second signal line pair 34, which is a pair of signal lines 3, is connected to the input terminal 652*b* and the output terminal 653*b*. In particular, as shown in FIG. 7B, the second conductor wire 31 of the signal line 3*d* is connected to the input terminal 652*b* by solder or welding, etc. The second conductor wire 31 of the signal line 3*b* is connected to the output terminal 653*b* by solder or welding, etc.

The power-supply voltage Vcc to drive the second sensor IC 65*b* is supplied to the input terminal 652*b* from the ABS control unit 904. The output terminal 653*b* is connected to the ground circuit (GND) and the detection signal $S_2$ is output to the ABS control unit 904 through the output terminal 653*b*.

Since the second conductor wires 31 are connected to the first sensor IC 65*a* on the front side and to the second sensor IC 65*b* on the opposite back side as shown in FIGS. 7A and 7B, the first sensor IC 65*a* and the second sensor IC 65*b* can be arranged close to each other as compared to when such a configuration is not adopted.

The first sensor IC 65*a* and the second sensor IC 65*b* are closely arranged and thus detect a change in magnetic field due to rotation of the rotor 7 in the same way. Therefore, the detection signal $S_1$ output from the first sensor IC 65*a* and the detection signal $S_2$ output from the second sensor IC 65*b* have substantially the same waveform and reliability is further improved.

The ABS control unit 904 calculates a rotation speed of the rotor 7 from, e.g., timing of "Hi" and "Lo" of any one of the detection signal $S_1$ and the detection signal $S_2$. Alternatively, the ABS control unit 904 may use an average of the rotation speed calculated from the detection signal $S_1$ and the rotation speed calculated from the detection signal $S_2$ as the rotation speed of the rotor 7.

The ABS control unit 904 also can perform failure detection by using the detection signal $S_1$ and the detection signal $S_2$. For example, in case that only the first sensor IC 65*a* is arranged and this first sensor IC 65*a* fails and keeps outputting the detection signal $S_1$ indicating "Lo", the ABS control unit 904 cannot detect whether the rotor 7 is not rotating, i.e., the vehicle is stationary or the first sensor IC 65*a* is failing to operate properly, only by the detection signal $S_1$.

However, in case that the first sensor IC 65*a* and the second sensor IC 65*b* are arranged, the ABS control unit 904 compares the detection signal $S_1$ to the detection signal $S_2$ and thereby can determine that one of the first sensor IC 65*a* and the second sensor IC 65*b* is failing to operate properly. When failure is detected, the ABS control unit 904 outputs a signal indicating occurrence of failure to the ECU 902 and causes a display device of the vehicle 9 to display an alert indicating failure.

(Functions and Effects of the Embodiment)

As described above, in the composite harness 1 of the present embodiment, plural pairs of signal line 3 are arranged at opposing vertices of a polygon and are twisted together while maintaining a state of being in contact with each other. Therefore, as compared to when such a configuration is not adopted, it is possible to reduce the diameter of the signal line unit 30 and also suppress a decrease in resistance to noise.

In the composite harness 1, kink of the first assembled article 11 and kink of the second assembled article 12, which are caused by twisting, are in the opposite directions and thus cancel out each other, allowing the composite cable 10 to be straight with suppressed kink.

In the composite harness 1, the twisting directions of the first assembled article 11 and the second assembled article 12 are different. Therefore, as compared to when twisted in the same direction, it is possible to maintain the twist pitch of the first assembled article 11 and thereby possible to suppress an effect of external noise due to unstable twist. In addition, since the composite harness 1 can suppress the effect of external noise, it is possible to highly accurately calculate the rotation speed based on the detection signal $S_1$ output from the first magnetic sensor 651*a* of the first sensor IC 65*a* and the detection signal $S_2$ output from the second magnetic sensor 651*b* of the second sensor IC 65*b* and it is also possible to highly accurately detect failure, hence, it is possible to improve reliability.

In the composite harness 1, the twisting directions of the first assembled article 11 and the second assembled article 12 are different. Therefore, as compared to when twisted in the same direction, it is possible to suppress looseness of the twist of the first assembled article 11.

In the composite harness 1, the twisting direction of the first conductor wire 21 of the power line 2 and the twisting direction of the second assembled article 12 are the same. Therefore, as compared to when twisted in different directions, it is possible to suppress looseness of the twist of the first conductor wire 21.

(Summary of the Embodiment)

Technical ideas understood from the embodiment will be described below citing the reference numerals, etc., used for the embodiment. However, each reference numeral, etc., described below is not intended to limit the constituent elements in the claims to the members, etc., specifically described in the embodiment.

A [1] composite cable (10), comprising: a plurality of power lines (2); one signal line unit (30); and a sheath (5) collectively covering the plurality of power lines (2) and the one signal line unit (30), wherein the signal line unit (30) comprises a plurality of pairs of signal lines (3), and an inner sheath (35) covering a first assembled article (11) including the signal lines (3) to be paired being arranged at a pair of opposing vertices (80 and 82, 81 and 83) of a polygon (8) with an even number of vertices (80 to 83) in a cross-section perpendicular to a longitudinal direction of the signal line unit (30) and being twisted all together.

[2] The composite cable (10) described in [1], wherein the sheath (5) is provided so as to collectively cover a second assembled article (12) including the plurality of power lines (2) and the one signal line unit (30) being twisted together.

[3] The composite cable (10) described in [2], wherein a twisting direction of the first assembled article (11) is different from a twisting direction of the second assembled article (12).

[4] The composite cable (10) described in any one of [1] to [3], wherein the plurality of pairs of signal lines (3) are twisted together in a state where adjacent ones of the signal lines (3) are in contact with each other.

[5] A composite harness (1), comprising: the composite cable (10) described in any one of [1] to [4]; and a connector (23, 24, 64) attached to at least any of end portions of the plurality of power lines (2) and the signal line unit (30).

Although the embodiment of the invention has been described, the invention according to claims is not to be limited to the embodiment described above. Further, please note that not all combinations of the features described in the embodiment are necessary to solve the problem of the invention.

Figure 8:
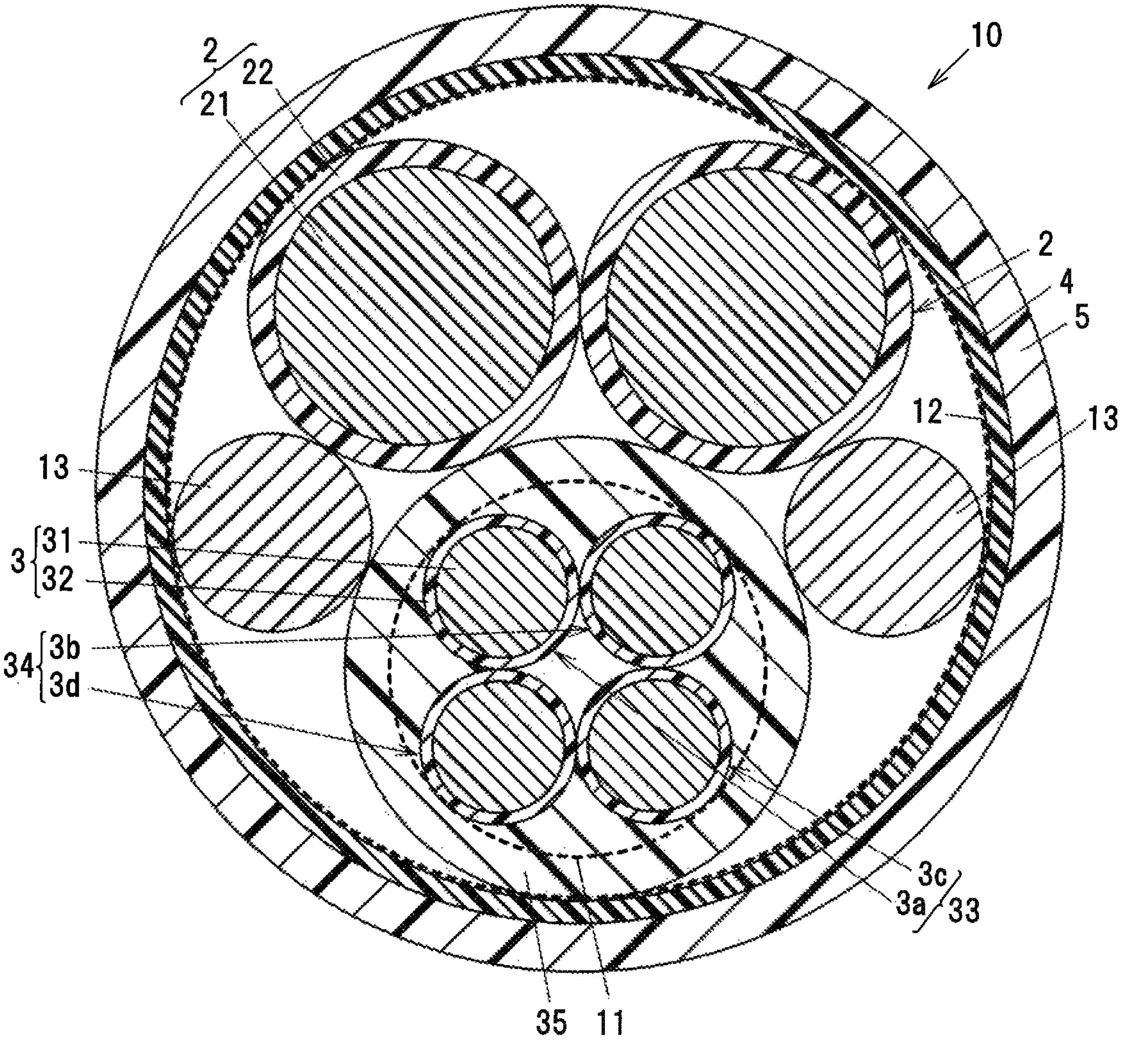
FIG. 8 is an example cross-sectional view showing a composite cable of the composite harness in another embodiment.

The invention can be appropriately modified and implemented without departing from the gist thereof. FIG. 8 is an example cross-sectional view showing the composite cable of the composite harness in another embodiment.

The composite cable 10 of the composite harness 1 in the present embodiment has plural insulated wires 13 that are arranged between the power lines 2/the signal line unit 30 and the binding tape 4, e.g., as shown in FIG. 8. As an example, these plural insulated wires 13 are electric wires to supply a current to an air pressure sensor for measuring air pressure of a tire of the vehicle 9 and also to output a detection signal indicating a measurement result, but it is not limited thereto. In addition, although two insulated wires 13 are shown in FIG. 8 as an example, it is not limited thereto. In the composite cable 10, for example, more than or less than two insulated wires 13 may be provided, the insulated wires 13 may be a combination of different types of electric wires such as signal and power lines, interpositions may be provided instead of the insulated wires, and furthermore, a combination thereof may be arranged.

In addition, although the ABS sensor 65 in the embodiment uses the first sensor IC 65*a* and the second sensor IC 65*b* to detect failure, it is not limited thereto. One of the sensor ICs may be mainly used and the other sensor IC may be used as a backup. In this case, as an example, the ABS control unit 904 performs failure detection based on information about the vehicle 9 acquired from the ECU 902 and a detection signal acquired from the main sensor IC, and switches to the backup sensor IC based on occurrence of failure.

What is claimed is:

1. A composite harness, comprising:

a composite cable, comprising:

a plurality of power lines, each comprising a first conductor wire and a first insulation consisting of a single layer covering the first conductor wire;

one signal line unit; and a sheath being composed of a resin and collectively covering the plurality of power lines and the one signal line unit, and the sheath being devoid of a conductive layer, wherein the signal line unit comprises a plurality of pairs of signal lines, and an inner sheath covering a first assembled article including the signal lines to be paired being arranged at each pair of opposing vertices of a polygon with an even number of vertices in a cross-section perpendicular to a longitudinal direction of the signal line unit and being twisted all together, wherein all of the signal lines are arranged side by side in a circumferential direction of the signal line unit to be twisted together, wherein outer peripheries of the plurality of pairs of signal lines are devoid of a shield, wherein the inner sheath includes an extruded resin which enters into valleys between respective signal lines adjacent to each other in the circumferential direction, wherein, in an entire circumference of the first assembled article, a thickness from the first assembled article to an outer periphery surface of the inner sheath is greater than a thickness of the first insulation in each of the plurality of power lines, and wherein a twisting direction of the first conductor wire, including an entire outer periphery contacting the first insulation, is opposite to a twisting direction of the first assembled article and is the same as a twisting direction of a second assembled article including the plurality of power lines and the one signal line unit being twisted together, the composite harness further comprising:

a connector attached to at least any of end portions of the plurality of power lines and the signal line unit, wherein the plurality of pairs of signal lines are composed of four signal lines, wherein a first signal line and a second signal line facing each other, out of the four signal lines, are connected to a first sensor IC, and wherein a third signal line and a fourth signal line facing each other, out of the four signal lines, are connected to a second sensor IC.

2. The composite harness according to claim 1, wherein the sheath is provided so as to collectively cover the second assembled article including the plurality of power lines and the one signal line unit being twisted together.

3. The composite harness according to claim 2, further comprising a binding tape provided between the second assembled article and the sheath, and wherein a twist pitch of the second assembled article is greater than that of the first assembled article.

4. The composite harness according to claim 2, wherein the twisting direction of the first assembled article is different from the twisting direction of the second assembled article.

5. The composite harness according to claim 4, wherein the twisting direction of the first assembled article is opposite to the twisting direction of the second assembled article.

6. The composite harness according to claim 1, wherein the plurality of pairs of signal lines are twisted together in a state where adjacent ones of the signal lines are in contact with each other.

7. The composite harness according to claim 1, wherein the twisting direction of the first assembled article is a direction that, when viewed from a first end of the first assembled article, the signal lines rotate from a second end to the first end of the first assembled article, and wherein the twisting direction of the second assembled article is a direction that, when viewed from a first end of the second assembled article, the power lines and the signal line unit rotate from a second end to the first end of the second assembled article.

8. The composite harness according to claim 1, wherein the first sensor and the second sensor constitute an ABS sensor.

9. A composite harness, comprising:

a composite cable, comprising:

a plurality of power lines, each comprising a first conductor wire and a first insulation covering the first conductor wire;

one signal line unit; and a sheath being composed of a resin and collectively covering the plurality of power lines and the one signal line unit, and the sheath being devoid of a conductive layer, wherein the signal line unit comprises a plurality of pairs of signal lines, and an inner sheath covering a first assembled article including the signal lines to be paired being arranged at each pair of opposing vertices of a polygon with an even number of vertices in a cross-section perpendicular to a longitudinal direction of the signal line unit and being twisted all together, wherein outer peripheries of the plurality of pairs of signal lines are devoid of a shield, wherein the inner sheath enters between the adjacent ones of signal lines, wherein, in an entire circumference of the first assembled article, a thickness from the first assembled article to an outer periphery surface of the inner sheath is greater than a thickness of the first insulation in each of the plurality of power lines, and wherein a twisting direction of the first conductor wire, including an entire outer periphery contacting the first insulation, is opposite to a twisting direction of the first assembled article and is the same as a twisting direction of a second assembled article including the plurality of power lines and the one signal line unit being twisted together, the composite harness further comprising:

a connector attached to at least any of end portions of the plurality of power lines and the signal line unit, wherein the plurality of pairs of signal lines are composed of four signal lines, wherein a first signal line and a second signal line facing each other, out of the four signal lines, are connected to a first sensor IC, and wherein a third signal line and a fourth signal line facing each other, out of the four signal lines, are connected to a second sensor IC.

10. The composite harness according to claim 9, wherein all of the signal lines are arranged side by side in a circumferential direction of the signal line unit to be twisted together.

11. The composite harness according to claim 9, wherein the inner sheath comprises an extruded resin.

12. The composite harness according to claim 9, wherein the inner sheath enters into valleys between respective signal lines adjacent to each other in the circumferential direction.

13. The composite harness according to claim 9, wherein the sheath collectively covers the second assembled article including the plurality of power lines and the one signal line unit being twisted together.

14. The composite harness according to claim 13, wherein the twisting direction of the first assembled article is different from the twisting direction of the second assembled article.

15. The composite harness according to claim 14, wherein the twisting direction of the first assembled article is opposite to the twisting direction of the second assembled article.

16. The composite harness according to claim 13, further comprising a binding tape provided between the second assembled article and the sheath, and wherein a twitch pitch of the second assembled article is greater than that of the first assembled article.

17. A composite harness, comprising:

a composite cable, comprising:

a plurality of power lines, each comprising a first conductor wire and a first insulation covering the first conductor wire;

one signal line unit; and a sheath being composed of a resin and collectively covering the plurality of power lines and the one signal line unit, and the sheath being devoid of a conductive layer, wherein the signal line unit comprises a plurality of pairs of signal lines, and an inner sheath covering a first assembled article including the signal lines to be paired being arranged at each pair of opposing vertices of a polygon with an even number of vertices in a cross-section perpendicular to a longitudinal direction of the signal line unit and being twisted all together, wherein all of the signal lines are arranged side by side in a circumferential direction of the signal line unit to be twisted together, wherein outer peripheries of the plurality of pairs of signal lines are devoid of a shield, wherein the inner sheath includes an extruded resin which enters between signal lines adjacent to each other in the circumferential direction, wherein, in an entire circumference of the first assembled article, a thickness from the first assembled article to an outer periphery surface of the inner sheath is greater than a thickness of the first insulation in each of the plurality of power lines, and wherein a twisting direction of the first conductor wire, including an entire outer periphery contacting the first insulation, is opposite to a twisting direction of the first assembled article and is the same as a twisting direction of a second assembled article including the plurality of power lines and the one signal line unit being twisted together, the composite harness further comprising:

a connector attached to at least any of end portions of the plurality of power lines and the signal line unit, wherein the plurality of pairs of signal lines are composed of four signal lines, wherein a first signal line and a second signal line facing each other, out of the four signal lines, are connected to a first sensor IC, and wherein a third signal line and a fourth signal line facing each other, out of the four signal lines, are connected to a second sensor IC.

18. The composite harness according to claim 17, wherein the extruded resin enters into valleys between respective signal lines adjacent to each other in the circumferential direction.

19. The composite harness according to claim 17, wherein the sheath collectively covers the second assembled article including the plurality of power lines and the one signal line unit being twisted together.

20. The composite harness according to claim 19, further comprising a binding tape provided between the second assembled article and the sheath, wherein the twisting direction of the first assembled article is different from the twisting direction of the second assembled article, and wherein a twitch pitch of the second assembled article is greater than that of the first assembled article.

* * * * *